United States Patent [19]

Smith et al.

[11] 4,314,934
[45] Feb. 9, 1982

[54] ORGANOHALIDE POLYMERS STABILIZED WITH AN ORGANOTIN COMPOUND AND AN ORTHO MERCAPTO PHENOL COMPOUND

[75] Inventors: Kenneth V. Smith, Cincinnati, Ohio; Jack D. Taylor, Katy, Tex.

[73] Assignee: Carstab Corporation, Reading, Ohio

[21] Appl. No.: 238,506

[22] Filed: Feb. 26, 1981

[51] Int. Cl.³ ............................................. C08K 5/58
[52] U.S. Cl. ........................ 260/45.75 S; 252/400 R; 252/406; 260/23 XA; 260/45.75 K; 260/45.75 T; 260/45.95 C
[58] Field of Search ............... 260/45.75, 45.95 C, 260/23 XA; 252/400 R, 406

[56] References Cited

U.S. PATENT DOCUMENTS

| | | | |
|---|---|---|---|
| 3,004,949 | 10/1961 | Chevassus | 260/45.7 S |
| 3,063,963 | 11/1962 | Wooten et al. | 260/45.75 T |
| 3,103,500 | 9/1963 | Tholstrup et al. | 260/45.95 C |
| 3,385,818 | 5/1968 | Kauder | 260/45.75 |
| 3,442,806 | 5/1969 | O'Neill | 260/46.4 |
| 3,503,924 | 3/1970 | Pollock | 260/45.75 S |
| 3,507,827 | 4/1970 | Pollock | 260/45.85 C |
| 3,632,538 | 1/1972 | Kauder | 260/45.75 S |
| 3,665,025 | 5/1972 | Wowk | 260/45.75 S |
| 3,674,737 | 7/1972 | Brecker et al. | 260/45.75 S |
| 3,715,333 | 2/1973 | Larkin | 260/45.75 S |
| 3,772,244 | 11/1973 | Wouk | 260/45.75 S |
| 3,778,456 | 12/1973 | Hoye et al. | 260/45.75 S |
| 3,793,356 | 2/1974 | Williams | 260/45.75 S |
| 3,809,677 | 5/1974 | Oakes et al. | 260/45.75 S |
| 3,875,084 | 4/1974 | Weil | 260/2 EC |
| 3,890,276 | 6/1975 | Stapfer | 260/45.75 S |
| 3,928,285 | 12/1975 | Gough | 260/45.7 S |
| 3,933,750 | 1/1976 | Coates et al. | 260/45.75 S |
| 4,043,957 | 8/1977 | Szabo | 260/45.75 S |
| 4,062,881 | 12/1977 | Kugele | 260/45.75 S |
| 4,111,903 | 9/1978 | Hoch et al. | 260/45.75 S |
| 4,115,352 | 9/1978 | Bohen et al. | 260/45.75 S |
| 4,118,371 | 10/1978 | Kugele | 260/45.75 S |
| 4,134,878 | 1/1979 | Burley et al. | 260/45.75 S |
| 4,181,671 | 1/1980 | Burley et al. | 260/45.75 S |
| 4,237,043 | 12/1980 | Korbanka et al. | 260/45.75 S |
| 4,254,017 | 3/1981 | Dworkin | 260/45.75 S |

*Primary Examiner*—V. P. Hoke
*Attorney, Agent, or Firm*—Richard J. Sheridan; Gerald K. White

[57] ABSTRACT

Compositions which are effective in stabilizing polymers against the deteriorative effects of heat are provided comprising (1) an organic tin compound or mixture of organic tin compounds and (2) an organic compound or mixture of organic compounds having an aromatic ring which is substituted with hydroxy (—OH) and mercapto (—SH) groups ortho to each other. Also provided are polymer compositions containing said stabilizers and articles of manufacture made from said stabilized polymer compositions.

17 Claims, No Drawings

ORGANOHALIDE POLYMERS STABILIZED WITH AN ORGANOTIN COMPOUND AND AN ORTHO MERCAPTO PHENOL COMPOUND

FIELD OF INVENTION

This invention relates to new and useful polymer stabilizer compositions comprising: (1) an organic tin compound or mixture of organic tin compounds and (2) an organic compound or mixture of organic compounds having an aromatic ring which is substituted with a hydroxyl (—OH) group and a mercapto (—SH) group ortho to each other. Additionally, this invention relates to polymer compositions comprising: (1) an organic polymer, more particularly a halogenated organic polymer, (2) an organic tin compound stabilizer or mixture of organic tin compound stabilizers and (3) an organic compound or mixture of organic compounds having an aromatic ring which is substituted with a hydroxyl (—OH) group and a mercapto (—SH) group ortho to each other. Further, this invention relates to articles of manufacture, e.g. pipe, made from polymer compositions comprising: (1) an organic polymer, more particularly a halogenated organic polymer, (2) an organic tin compound stabilizer or mixture of organic tin compound stabilizers and (3) an organic compound or mixture of organic compounds having an aromatic ring which is substituted with a hydroxy (—OH) group and a mercapto (—SH) group ortho to each other.

BACKGROUND

It is well known that various organic polymers undergo deterioration of physical properties and color changes during processing and during exposure of the formed polymer products to various end use environmental conditions. This deterioration of physical properties and color change is particularly pronounced in some polymers (e.g. halogenated polymers) upon their exposure to heat during processing, particularly the processing into formed articles of commerce. Undesirable color changes are observed to occur at the early stages (e.g. within the first 5 to 10 minutes) of the elevated temperature processing of the polymer as well as during the prolonged exposure of the polymer to heat during processing. Sometimes haziness or cloudiness accompany the color changes of the polymer and is particularly undesirable where clear or colorless products are needed. In many methods for making a polymer into a finished product the polymer remains in the processing apparatus, exposed to high temperatures, for a short period of time and therefore the color change or discoloration of the polymer resulting from prolonged exposure to heat during processing becomes only a minor consideration. The color change of the polymer during such short exposure to heat during processing has become known as early color and is of importance in the shaping of polymers into various products (e.g. pipe), particularly products which are to be light in color.

Early color is often manifested in various degrees of yellowing of the polymer, although other coloration has also been observed in early color problems. The problem of early color has received increasing attention in recent years and has become a significant consideration in the stabilization of polymers. However, there remains considerable need for improvement of the early color heat stabilization, as well as the long term heat stabilization, of polymers.

In the heat stabilization of organic polymers (e.g. halogen containing organic polymers) early color and long term color formation have been attacked by the art with various stabilizers, mixtures of stabilizers and stabilizer compositions. Organotin compounds (e.g. diorganotin mercaptides) have been used by the art alone or in combination with various other materials (e.g. mercaptoalcohols, phenols and dihydric phenols). However, such prior art stabilizers, combinations of stabilizers and stabilizer compositions have not been entirely satisfactory for a variety of reasons including low effectiveness, high cost, instability, color and poor compatibility. Better stabilizers or stabilizer compositions are needed.

SUMMARY OF INVENTION

There has now been found a surprisingly highly effective composition for stabilizing organic polymers which overcomes many of the disadvantages of prior art stabilizers and which is effective in the early color stabilization of organic polymers during processing. Additionally, there have been surprisingly found organic polymer compositions which have improved resistance to early color formation during processing. In accordance with this invention there is provided a stabilizer composition comprising: (1) an organic tin compound or a mixture of organic tin compounds and (2) an organic compound or mixture of organic compounds having one of more six membered carbocyclic aromatic rings in which at least one of said aromatic ring has bonded directly thereto a total of from two to five hydroxyl (—OH) and mercapto (—SH) groups with the proviso that at least one hydroxyl group and one mercapto group are directly bonded to adjacent ring carbon atoms. Further, there is now provided in accordance with this invention an organic polymer composition, having improved resistance to early color formation during processing, comprising, (1) an organic polymer normally susceptible to heat induced deterioration or discoloration, (2) an organic tin compound or mixture of organic tin compounds and (3) an organic compound or mixture of organic compounds having one or more six membered carbocyclic aromatic rings in which at least one of said aromatic rings has bonded directly thereto a total of from two to five hydroxyl (—OH) and mercapto (—SH) groups with the proviso that at least one hydroxyl group and one mercapto group are directly bonded to adjacent ring carbon atoms. Additionally, there is now provided in accordance with this invention articles of manufacture, e.g. pipe, comprising: (1) an organic polymer, more particularly a halogenated organic polymer, (2) an organic tin compound stabilizer or mixture of organic tin compound stabilizers and (3) an organic compound or mixture of organic compounds having an aromatic ring which is substituted with a hydroxy (—OH) group and a mercapto (—SH) group ortho to each other.

DESCRIPTION OF INVENTION

The stabilizer composition in accordance with this invention has unexpectedly been found to be highly effective in the stabilization of organic polymers exposed to heat during processing. More especially the stabilizer composition of this invention has been unexpectedly found to be highly effective in the early color stabilization of organic polymers exposed to heat during processing (i.e. to be highly effective in reducing or preventing discoloration of an organic polymer during the early stages of the exposure of the organic polymer to heat during processing). Additionally, there has now been unexpectedly found in accordance with this invention an advantageous polymer composition having improved stability, more particularly improved resistance to early color formation upon exposure to heat during processing.

In accordance with this invention, there is now provided a stabilizer composition comprising: (1) an organic tin compound or mixture of organic tin compounds and (2) an organic compound or mixture of organic compounds having one or more six membered carbocyclic aromatic rings in which at least one of said aromatic rings has bonded directly thereto, a total of from two to five hydroxyl (—OH) and mercapto (—SH) groups with the proviso that at least one hydroxyl group and one mercapto group are directly bonded to adjacent ring carbon atoms. Further, in accordance with this invention there is now provided a polymer composition comprising: (1) an organic polymer normally susceptible to deterioration or discoloration upon exposure to heat, (2) an organic tin compound or mixture of organic tin compounds and (3) an organic compound or mixture of organic compounds having one or more six membered carbocyclic aromatic rings in which at least one of said aromatic rings has bonded directly thereto a total of from two to five hydroxyl (—OH) and mercapto (—SH) groups with the proviso that at least one hydroxyl group and one mercapto group are directly bonded to adjacent ring carbon atoms. Additionally, in accordance with this invention there are now provided articles of manufacture, e.g. pipe comprising: (1) an organic polymer, more particularly a halogenated organic polymer, (2) an organic tin compound stabilizer or mixture of organic tin compound stabilizers and (3) an organic compound or mixture of organic compounds having an aromatic ring which is substituted with a hydroxy (—OH) group and a mercapto (—SH) group ortho to each other.

The stabilizer composition of this invention more particularly comprises: (1) an organic tin compound or mixture of organic tin compounds selected from compounds having the formulas:

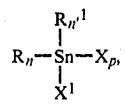  (I)

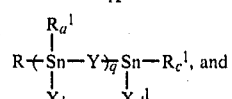  (II)

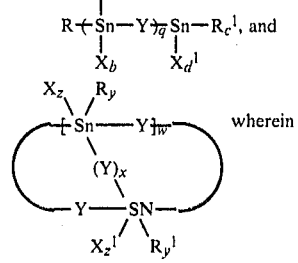 wherein  (III)

X and $X^1$ are the same or different and are selected from —$SR^2$, Cl, Br, I,

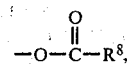

and O—$R^8$ with the proviso that in formula (III) when $z=1$ and in formulas (I) and (II) at least one X or $X^1$ is —$SR^2$;

Y is $(S)_r$, —W—$R^3$—$W^1$—, —S—$R^4$—C(=O)—O,

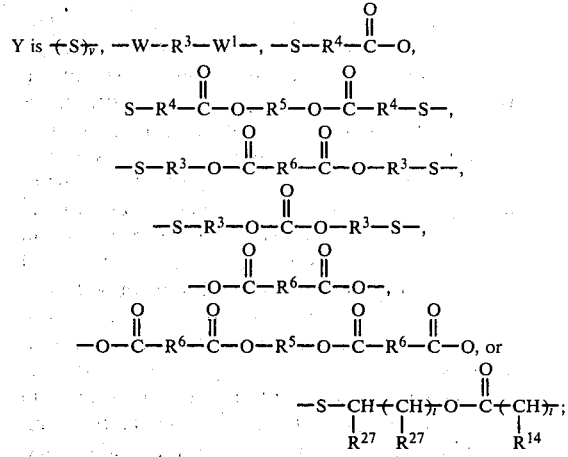

W and $W^1$ are the same or different and are oxygen or sulfur;

R and $R^1$ are the same or different and are selected from alkyl, aryl, alkenyl, aralkyl, alkaryl, cycloalkyl, cycloalkenyl,

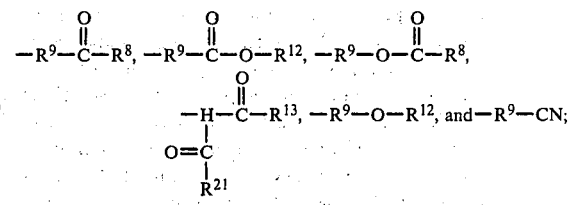

$R^2$ is alkyl, alkenyl, aryl, hydroxy-substituted aryl, aralkyl, cycloalkyl, cycloalkenyl,

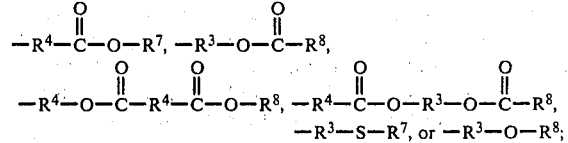

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is —H or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy; $R^{14}$ is —H, aryl or $C_1$ to $C_{18}$ alkyl;

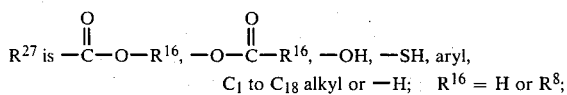

$R^{27}$ is $-\overset{O}{\underset{\|}{C}}-O-R^{16}$, $-O-\overset{O}{\underset{\|}{C}}-R^{16}$, —OH, —SH, aryl, $C_1$ to $C_{18}$ alkyl or —H; $R^{16}$ = H or $R^8$;

$i=0$ or an integer from 1 to 6 inclusive;
$n=0$, 1 or 2, $n'=0$, 1 or 2 and $p=1$ or 2 with the proviso that $n+n'=1$ or 2 and $n+n'+p=3$; $a=0$, 1 or 2, $b=0$, 1 or 2, $q=1$ to 5, $c=1$, 2 or 3 and $d=0$, 1 or 2 with the proviso that $a+b=2$ and $c+d=3$; $v=$ an integer from 1 to 8 inclusive; and $w=0$, 1 or 2, $x=0$ or 1, $y=1$ or 2, $z=0$ or 1 with the proviso that when $x=0$ and $w=1$ or 2 then $y=1$ and $z=1$, when $x=1$ then $y=1$, $z=0$ and $w=1$, when $w=2$ then $x=0$, $y=1$ and $z=1$, and when $w=0$ then $x=0$, $y=1$, $z=1$ and Y is $-W-R^3-W^1-$ or

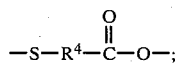

and
(2) an organic compound or mixture of organic compounds selected from compounds having the following formulas:

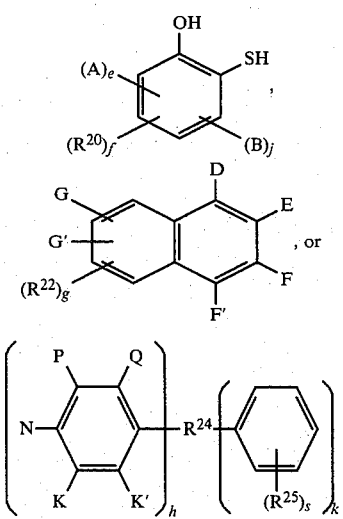

wherein
A is nothing, —OH or —SH,
B is nothing, —OH or —SH
D is —H, —SH, —OH or $R^{26}$
E is —H, —OH, —SH or $R^{26}$
F is —H, —SH, —OH or $R^{26}$
F' is —H, —OH, —SH or $R^{26}$
G is nothing, —OH or —SH
G' is nothing, —SH or —OH
K is —H, —SH, —OH or $R^{23}$
K' is —H, —OH, —SH or $R^{23}$
N is —H, —SH, —OH or $R^{23}$
P is —H, —SH, —OH or $R^{23}$
Q is —H, —SH, —OH or $R^{23}$
$R^{20}$ is nothing, alkyl, aryl, alkenyl, alkaryl, cycloalkyl, alkoxy or halogen,
$R^{26}$ is alkyl, alkenyl or halogen
$R^{22}$ is alkyl, alkenyl or halogen
$R^{23}$ is alkyl, alkenyl or halogen
$R^{24}$ is alkylene or alkenylene
$R^{25}$ is alkyl, alkenyl, halogen, —SH or —OH
e is 0 to 2
j is 0 to 2
f is 0 to 3
s is 0 to 3
g is 0 to 3
h is 1 to 4
k is 0 to 3
h+k is 2 to 4
e+j+f is 0 to 4 with the proviso that (1) in formula (V) two of groups D, E, F and F' must be an OH group and an SH group bonded directly to adjacent ring carbon atoms, and (2) in formula (VI) two of groups K, K', N, P and Q must be an OH group and an SH group bonded directly to adjacent ring carbon atoms.

As used herein the term alkyl represents monovalent straight or branched chain hydrocarbon radicals containing, for example, 1 to 20 carbon atoms. The term aryl refers to monovalent $C_6$-$C_{10}$ aromatic rings such as benzene and naphthalene. The term hydroxy-substituted aryl refers to $C_6$-$C_{10}$ aromatic rings having bonded directly thereto at least one —OH group. The term alkenyl refers to monovalent straight or branched chain $C_2$ to $C_{20}$ hydrocarbon radicals containing at least one double bond. The term aralkyl represents a monovalent $C_1$ to $C_{20}$ hydrocarbon radical having attached thereto an aryl radical. The term alkaryl refers to monovalent aryl radicals having attached thereto at least one $C_1$-$C_{20}$ alkyl radical. The term cycloalkyl represents monovalent $C_3$-$C_8$ Saturated cycloaliphatic radicals, and the term cycloalkenyl represents $C_5$-$C_8$ cycloaliphatic radicals containing at least one double bond.

The organic tin compounds according to formulas (I), (II) and (III) and the organic compounds according to formulas (IV), (V) and (VI) may all be prepared by methods well known in the art. For example, methods for preparing the organic tin compounds according to formulas (I), (II) and (III) are disclosed in U.S. Pat. No. 2,267,777, 2,746,946, 3,021,302, 3,565,930, 3,565,931, 3,869,487, 3,979,359, 4,118,371, 4,134,878 and 4,183,846.

In accordance with the practice of this invention, the organic compounds according to formulas (IV), (V) and (VI) have a vicinal OH/SH arrangement (i.e. have an —OH group and an —SH group on adjacent ring carbon atoms). However, the organic compounds according to formulas (IV), (V) and (VI) may have, in addition to the first vicinal OH/SH arrangement on the ring, further vicinal OH/SH arrangements on the ring. Such additional vicinal OH/SH arrangements on the ring may be separated from the first vicinal OH/SH arrangement on the ring by one or more ring carbon atoms or may occupy a position on the ring adjacent to the first vicinal OH/SH arrangement on the ring or may include the OH or SH or both OH and SH of the first vicinal OH/SH arrangement. These arrangements of OH groups and SH groups may be illustrated by the following examples. In formula (IV) the ring carbon atoms may be numbered consecutively in a clockwise manner starting at the carbon atom to which the OH group is attached as being number one. A compound according to formula (IV) having the single vicinal OH/SH arrangement shown therein would have the OH group and SH group at ring carbon atoms numbered one and two respectively. Other compounds according to formula (IV) having more than one vicinal OH/SH arrangement may, for example, include such compounds according to formula (IV) having a further OH group at ring carbon number four and a further SH group at ring carbon number five, a compound according to formula (IV) having a further OH group at ring carbon number three, or a compound according to formula (IV) having a further SH group at ring carbon number 6. In a like manner, multiple vicinal OH/SH arrangements may be present in compounds according to formulas (V) and (VI) in the practice of this invention.

The preferred organotin compounds useful in this invention are those compounds according to formula (I) where R is methyl or butyl, $R^1$ is methyl or butyl, X is —$SR^2$ where $R^2$ is

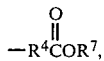

$X^1$ is —$SR^2$ where $R^2$ is

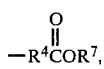

$n=0$, 1 or 2, $n'=0$, 1 or 2, $n+n'=2$, and $p=1$; those compounds according to formula (II) where R is methyl or butyl, X is —$SR^2$ where $R^2$ is

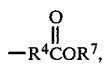

$R^1$ is methyl or butyl, $X^1$ is —$SR^2$ where $R^2$ is

Y is —S—, $a=1$, $b=1$, $c=2$, $d=1$ and $q=1$; and those compounds according to formula (III) where R is methyl or butyl, X is —$SR^2$ where $R^2$ is

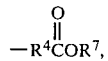

$R^1$ is methyl or butyl, $X^1$ is —$SR^2$ where $R^2$ is

Y is —S—, $w=1$ or 2, $x=0$, $y=1$ and $z=1$.

Organotin compounds according to formulas (I), (II) and (III) include, but are not limited to, compounds shown in the following Tables I, II and III, respectively.

TABLE I

| R | X | n | n' | p |
|---|---|---|---|---|
| —$CH_3$ | —$SCH_2COC_8H_{17}$ (C=O) | 1 | 0 | 2 |
| —$C_4H_9$ | —$SCH_2CH_2OCC_7H_{15}$ (C=O) | 1 | 0 | 2 |
| —$CH_2CH_2COC_4H_9$ (C=O) | —$SCH_2CH_2OCCH_3$ (C=O) | 2 | 0 | 1 |
| —$CH_3$ | —$SCH_2CH_2OCC_{17}H_{35}$ (C=O) | 2 | 0 | 1 |

TABLE III

| R | X | Y | w | x | y | z |
|---|---|---|---|---|---|---|
| —CH$_3$ | — | —SCH$_2$CH$_2$OC(=O)—⟨C$_6$H$_{10}$⟩—C(=O)OCH$_2$CH$_2$S— | 1 | 1 | 1 | 0 |

As used in Tables I–III above, and throughout this specification, the radicals —C$_4$H$_9$, —C$_8$H$_{17}$, —C$_{12}$H$_{25}$, —C$_9$H$_{19}$ and —C$_{10}$H$_{21}$ represent n-butyl, n-octyl, n-dodecyl, n-nonyl and n-decyl respectively.

The carboxyl radicals

—OC(=O)C$_{17}$H$_{33}$, —OC(=O)C$_{17}$H$_{35}$, —OC(=O)C$_7$H$_{15}$, —OC(=O)C$_{11}$H$_{23}$ and —OC(=O)C$_8$H$_{17}$ are derived from oleic acid, stearic acid, n-octanoic acid, lauric acid, and pelargonic acid respectively. Likewise, the radicals —OC$_{13}$H$_{27}$, —OC$_{18}$H$_{37}$, and —OC$_8$H$_{17}$ are derived from tridecanol, stearyl alcohol and iso-octanol respectively.

Organic compounds according to formula (IV) are preferably used in the practice of this invention. More preferably the compounds according to formula (IV) used in the practice of this invention are ortho hydroxythiophenol and lower alkyl (i.e. C$_1$ to C$_9$ alkyl) substituted ortho hydroxythiophenols.

As examples of organic compounds according to formula (IV), usable in the practice of this invention, there are included, but are not limited to, the following compounds:

1-hydroxy-2-mercapto benzene (ortho hydroxythiophenol)
1,3-dihydroxy-2-mercapto benzene
1,4-dihydroxy-2-mercapto benzene
1,5-dihydroxy-2-mercapto benzene
1,6-dihydroxy-2-mercapto benzene
1,3,4-trihydroxy-2-mercapto benzene
1,3,5-trihydroxy-2-mercapto benzene
1,3,6-trihydroxy-2-mercapto benzene
1,4,5-trihydroxy-2-mercapto benzene
1,4,6-trihydroxy-2-mercapto benzene
1,5,6-trihydroxy-2-mercapto benzene
1,3,4,5-tetrahydroxy-2-mercapto benzene
1,3,4,6-tetrahydroxy-2-mercapto benzene
1,4,5,6-tetrahydroxy-2-mercapto benzene
1,3,4,5,6-pentahydroxy-2-mercapto benzene
1-hydroxy-2,3-dimercapto benzene
1-hydroxy-2,4-dimercapto benzene
1-hydroxy-2,6-dimercapto benzene
1-hydroxy-2,3,5-trimercapto benzene
1-hydroxy-2,3,6-trimercapto benzene
1-hydroxy-2,3,4,5-tetramercapto benzene
1-hydroxy-2,3,4,6-tetramercapto benzene
1-hydroxy-2,3,4,5,6-pentamercapto benzene
1,3-dihydroxy-2,4-dimercapto benzene
1,3,-dihydroxy-2,6-dimercapto benzene
1,3,5-trihydroxy-2,4-dimercapto benzene
1,3,5-trihydroxy-2,4,6-trimercapto benzene
1-hydroxy-2-mercapto-4-methyl benzene
1,3-dihydroxy-2-mercapto-5,6-dioctyl benzene
1-hydroxy-2-mercapto-4-phenyl benzene
1-hydroxy-2-mercapto-5-cyclohexyl benzene
1,3-dihydroxy-2-mercapto-4-butyl benzene
1-hydroxy-2,6-dimercapto-4-chloro benzene
1-hydroxy-2-mercapto-4,5-dichloro benzene
1-hydroxy-2-mercapto-4-chloro-6-hexyl benzene
1-hydroxy-2-mercapto-3-ethyl-5 isopropyl benzene Examples of compounds according to formula (V) usable in the practice of this invention include, but are not limited to, compounds as shown in the following Table IV:

TABLE IV

| D | E | F | F' | R$^{22}$ | G | G' | g |
|---|---|---|---|---|---|---|---|
| OH | SH | — | — | — | — | — | 0 |
| — | OH | SH | — | — | — | — | 0 |
| OH | SH | OH | — | — | — | — | 0 |
| SH | OH | OH | — | — | — | — | 0 |
| OH | SH | — | OH | — | — | — | 0 |
| SH | OH | — | SH | — | — | — | 0 |
| OH | SH | — | — | — | OH | SH | 0 |
| OH | SH | OH | OH | — | — | — | 0 |
| OH | SH | — | —CH$_3$ | — | — | — | 0 |
| SH | OH | — | —C$_2$H$_5$ | — | — | — | 0 |
| — | OH | SH | — | —C$_6$H$_{13}$ | — | — | 1 |
| OH | SH | — | —C$_4$H$_9$ | —C$_8$H$_{17}$ | — | — | 2 |
| SH | OH | —C$_3$H$_9$ | — | —C$_4$H$_9$ | OH | — | — |
| OH | SH | — | OH | C$_2$H$_3$ | — | — | 1 |
| — | SH | OH | — | —C$_{12}$H$_{25}$ | SH | OH | 1 |
| OH | SH | —CH$_3$ | —CH$_3$ | — | — | — | 0 |
| OH | SH | — | — | Cl | — | — | 1 |
| OH | SH | — | Cl | — | — | — | 0 |
| OH | SH | — | Cl | C$_{18}$H$_{35}$ | — | — | 1 |
| OH | SH | — | Cl | — | SH | — | 0 |
| —C$_2$H$_5$ | SH | OH | —C$_2$H$_5$ | — | — | — | 0 |
| Cl | OH | SH | Cl | — | — | — | 0 |
| OH | SH | — | — | — | OH | OH | 0 |

Among examples of compounds according to formula (VI) usuable in the practice of this invention there are included, but not limited to, the compounds shown in the following Table V:

TABLE V

| K | K' | N | P | Q | R$^{25}$ | R$^{24}$ | h | k | s |
|---|---|---|---|---|---|---|---|---|---|
| — | — | OH | SH | — | — | CH$_2$ | 1 | 1 | 0 |
| — | — | OH | SH | — | — | CH$_2$ | 2 | 0 | 0 |
| — | — | — | OH | SH | — | CH$_2$ | 2 | 0 | 0 |
| — | — | — | SH | OH | — | CH$_2$ | 2 | 0 | 0 |
| OH | — | SH | OH | — | — | C(CH$_3$)$_2$ | 1 | 1 | 0 |
| SH | OH | — | SH | OH | — | C$_4$H$_8$ | 1 | 1 | 0 |
| — | — | OH | SH | OH | — | C$_2$H$_2$ | 1 | 1 | 0 |
| SH | C$_3$H$_7$ | OH | C$_3$H$_7$ | — | Br | C$_6$H$_{12}$ | 1 | 1 | 2 |
| OH | — | SH | OH | SH | C$_6$H$_{13}$ | CH$_2$ | 1 | 1 | 1 |
| OH | CH$_3$ | SH | — | — | — | CH$_2$ | 2 | 0 | 0 |
| OH | OH | SH | OH | OH | C$_8$H$_{17}$ | CH$_2$ | 1 | 1 | 1 |
| — | — | SH | SH | OH | C$_2$H$_5$ | C(CH$_3$)$_2$ | 1 | 1 | 2 |
| CH$_3$ | — | OH | SH | — | — | CH(CH$_2$)$_3$ | 3 | 0 | 0 |
| — | — | OH | SH | C$_3$H$_7$ | Cl | C$_{10}$H$_{24}$ | 1 | 1 | 1 |
| — | C$_4$H$_9$ | — | SH | OH | — | C(CH$_2$)$_4$ | 4 | 0 | 0 |
| C$_8$H$_{17}$ | — | C$_8$H$_{17}$ | OH | SH | CH$_3$ | C$_4$H$_7$(CH$_3$) | 1 | 1 | 1 |
| — | — | OH | SH | — | OH | C(CH$_3$)$_2$ | 1 | 1 | 1 |

In the stabilizer composition of this invention the weight ratio of (a) the organic tin compound or mixture of organic tin compounds according to formula (I), (II) and (III) to (b) the organic compound or mixture of organic compounds according to formula (IV), (V) and (VI) may vary over a wide range. There may be used a weight ratio of (a) the organic tin compound or mixture of organic tin compounds according to formula (I), (II) and (III) to (b) the organic compound or mixture of organic compounds according to formula (IV), (V) and (VI) of from about 400:1 to about 1:199, preferably from about 400:1 to about 1:100, more preferably from about 400:1 to about 1:20.

Various other substances may be added to or used in combination with the stabilizer composition of this invention including, for example, an innocuous diluent (e.g. hydrocarbon oil or hydrocarbon solvent), plasticizer, wax, lubricant, release agent, antioxidant, U.V. stabilizer and fire retardant well-known in the art. Methods well-known in the art for physically combining two or more materials into a homogeneous blend (i.e. a thoroughly mixed composition) may be used to prepare the stabilizer composition of this invention.

There is also now provided in accordance with this invention a polymer composition comprising (1) an organic polymer normally susceptible to thermal degradation and discoloration, (2) an organic tin compound or mixture of organic tin compounds according to formula (I), (II) and (III) and (3) an organic compound or mixture of organic compounds according to formula (IV), (V) and (VI).

In the practice of the polymer composition of this invention the combined amount by weight of the (a) organic tin compound or mixture of organic tin compounds according to formula (I), (II) and (III) and (b) organic compound or mixture of organic compounds according to formula (IV), (V) and (VI) used in the polymer composition may vary over a wide range, it being necessary only that there be employed a stabilizingly effective amount. There may be employed an amount by weight of the (a) organic tin compound or mixture of organic tin compounds according to formula (I), (II) and (III), and (b) organic compound or mixture of organic compounds according to formula (IV), (V) and (VI) that is conventionally employed by the art for adding a stabilizer to a polymer, such as 0.001 to 5%, preferably 0.01 to 2%, more preferably 0.01 to 1% based on the weight of the polymer. There may be used in the practice of the polymer composition of this invention a ratio of the (a) organic tin compound or mixture of organic tin compounds according to formula (I), (II) and (III) to (b) organic compound or mixture of organic compounds according to formula (IV), (V) and (VI) as previously disclosed herein for the stabilizer composition of this invention.

Conventional methods well known in the art for blending together polymers and additives may be employed to prepare the polymer compositions of this invention. The organic tin compound or mixture of organic tin compounds according to formula (I), (II) and (III) and the organic compound or mixture of organic compounds according to formula (IV), (V) and (VI) may be separately added to the polymer or they may be precombined and the combination added to the polymer. Other additives well known in the art, such as for example plasticizers, fillers, pigments, lubricants, antioxidants, fire retardants, U.V. stabilizers, antistatic agents and cross linking agents may be employed in the polymer composition of this invention.

Organic polymers normally susceptible to thermal deterioration (i.e. heat induced degradation) are generally useful in the practice of the polymer compositions of this invention. In view of their similar thermal behavior, i.e. discoloration, during elevated temperature processing and their similar capacity to dehydrohalogenate various halogen-containing organic polymers such as vinyl halide and vinylidene halide homopolymers and copolymers could be expected to be useful in the practice of this invention. Especially preferred to be used in the polymer composition of this invention is a homopolymer or copolymer or mixture thereof of a vinyl chloride or vinylidene chloride monomer. Mixtures of organic polymers at least one of which is a homopolymer or copolymer of a vinyl halide or vinylidene halide monomer may also be used in the practice of the polymer composition of this invention. Among the halogen containing organic polymers considered to be useful in the practice of the polymer composition of this invention there are included, for example, halogenated olefin homopolymers, halogenated olefin copolymers, vinyl halide homopolymers, vinyl halide copolymers, vinylidene halide homopolymers, vinylidene halide copolymers and polymer mixtures containing said halogen containing organic polymers.

As vinyl halide homopolymers, vinyl halide copolymers and polymer blends containing vinyl halide homopolymers or vinyl halide copolymers there, for example, include (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylate, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadienestyrene copolymer, and polyvinyl chloride and polyethylene and polymethyl methacrylate. Typical vinyl halide copolymers include vinyl chloride-vinyl acetate (87-13), vinyl chloride-vinylidene chloride (95-5), vinyl chloride-diethylfumarate (95-5), vinyl chloride-trichloroethylene (95-5) and vinyl chloride-2-ethylhexylacrylate (80-20). The polymer blends comprise physical blends of at least two distinct polymeric species and contain from 25 to 95 weight percent of vinyl halide homopolymer. The vinyl halide copolymers are copolymers comprising from 25 to 95 mole percent vinyl halide units.

Other halogen containing polymers may include, for example, chlorinated polyethylene having 14 to 75%, e.g. 27%, chlorine by weight chlorinated natural and synthetic rubber, chlorinated polystyrene and rubber hydrochloride. The homopolymers and copolymers of vinyl chloride or vinylidene chloride and polymer mixtures containing said homopolymer or copolymers are preferred in the practice of the polymer composition of this invention.

There is also provided in accordance with this invention articles of manufacture, e.g. pipe, produced from a polymer composition comprising: (1) an organic polymer normally susceptible to thermal degradation and discoloration, (2) an organic tin compound or mixture of organic tin compounds according to formulas (I), (II) and (III) and (3) an organic compound or mixture of organic compounds according to formulas (IV), (V) and (VI). The articles of manufacture according to this invention may be made by any of the well known conventional techniques for forming polymer compositions into desired shapes.

This invention is further described by the following nonlimiting examples in which all amounts are by weight and all temperatures are in degrees Centigrade unless otherwise indicated.

The following examples teach various stabilizer compositions according to this invention.

TABLE VI

| Stabilizer No. | Organic Tin Compound | Parts By Weight | Organic Compound | Parts By Weight |
|---|---|---|---|---|
| 1 | $(CH_3)_2Sn(TO-8)_2$[1] | 10.0 | o-hydroxy thiophenol | 0.1 |
| 2 | $(CH_3)_2Sn(TO-8)_2$ | 10.0 | o-hydroxy thiophenol | 2.0 |
| 3 | $(CH_3)_2Sn(TO-8)_2$ | 40.0 | o-hydroxy thiophenol | 0.1 |
| 4 | $(CH_3)_2Sn(TO-8)_2$ | 40.0 | o-hydroxy thiophenol | 2.0 |
| 5 | $(CH_3)_2Sn(TO-8)_2$ | 0.20 | MNP[2] | 0.01 |
| 6 | $(CH_3)_2Sn(TO-8)_2$ | 0.20 | MTBP[3] | 0.01 |
| 7 | $(CH_3)_2Sn(TO-8)_2$ | 0.20 | MMBP[4] | 0.01 |
| 8 | Bis [monomethyltin bis(2-mercaptoethyloleate)] sulfide/Bis(dimethyltin 2-mercaptoethyloleate) sulfide | 20.0 | o-hydroxy thiophenol | 1.30 |

[1]TO-8 represents isooctyl thioglycolate
[2]MNP is 2-mercapto-4-n-nonyl phenol
[3]MTBP is 2-mercapto-4-t-butyl phenol
[4]MMBP is 2-mercapto-4-methyl-6-t-butyl phenol In the following examples a preliminary blend of the formulation indicated below is prepared on a low shear, low speed mixer and then the preliminary blend added to a two roll mill having the rolls at a temperature of 193° C. One roll is operated at 30 RPM and the other roll operated at 40 RPM. The milled blend consisting of the formulation without any added stabilizer degrades to a pink color during the first two minutes it is on the mill. Milled blends consisting of the formulation with 0.001–0.02 phr of the organic compound OHTP alone as added stabilizer also degrades to a pink color during the first two minutes they are on the mill. Thus, the organic compound OHTP alone as added stabilizer does not improve the early color of the formulation. Milled blends consisting of the formulation with 0.10–0.40 phr of organic tin compounds in accordance with this invention as added stabilizers either alone or with OHTP do not degrade to a pink color during the first two minutes they are on the mill. Thus, two minutes after introducing the preliminary blend on the mill a resin sample is taken and then further resin samples are taken at one minute intervals. The whiteness of the roll side of each resin sample is measured on a Gardner Model XL-23 Tristimulus Colorimeter and the Whiteness Index determined in accordance with ASTM 313-73 paragraphs 5.6 and 5.7 (ASTM Part 27, Page 846). Whiteness Index values are converted to numerical ratings in accordance with the following table. These ratings are shown in the table of results below.

| Numerical Rating | 10 | 9 | 8 | 7 | 6 | 5 |
|---|---|---|---|---|---|---|
| Whiteness Index | ≧50 | 49 to 35 | 34 to 10 | 9 to −5 | −6 to −15 | ≦−16 |

| Formulation | |
|---|---|
| Material | Parts By Weight |
| Polyvinyl chloride[5] | 100.00 |
| OMYA 90T[6] | 3.00 |
| Titanium dioxide | 1.00 |
| Parraffin Wax[7] | 1.00 |
| Calcium stearate | 0.60 |
| AC 629A[8] | 0.15 |
| Stabilizer | as indicated below |

[5]Geone® 103 EP-F-76 obtainable from B.F. Goodrich Chemical Co.
[6]A fine particle size $CaCO_3$ coated with calcium stearate
[7]Advawax® 165 commercially available paraffin wax from Carstab Corporation
[8]An oxidized low molecular weight ethylene homopolymer obtainable from Allied Chemical Corporation Table of Stabilizing Results

| Example No. | Stabilizer | Am't of Stab. phr[9] | Numerical Rating After Minute[11] | | | | | | | | |
|---|---|---|---|---|---|---|---|---|---|---|---|
| | | | 2 | 3 | 4 | 5 | 6 | 7 | 8 | 9 | 10 |
| 1 | — | — | Pink | | | | | | | | |
| 2 | OHTP[10] | 0.01 | Pink | | | | | | | | |
| 3 | OHTP | 0.015 | Pink | | | | | | | | |
| 4 | OHTP | 0.02 | Pink | | | | | | | | |
| 5 | MNP | 0.01 | Pink | | | | | | | | |
| 6 | MTBP | 0.01 | Pink | | | | | | | | |
| 7 | MMBP | 0.01 | Pink | | | | | | | | |
| 8 | Stab. no. 1 from Table VI | 0.101 | 10 | 9 | 8 | 7 | 6 | 6 | 5 | | |
| 9 | $(CH_3)_2Sn(TO-8)_2$ | 0.10 | 9 | 8 | 7 | 7 | 6 | 5 | | | |
| 10 | Stab. no. 2 from Table VI | 0.12 | 10 | 10 | 9 | 8 | 7 | 6 | 5 | | |
| 11 | Stab. no. 3 from Table VI | 0.401 | 10 | 9 | 8 | 8 | 8 | 8 | 8 | 7 | 7 |
| 12 | $(CH_3)_2Sn(TO-8)_2$ | 0.40 | 10 | 9 | 8 | 8 | 8 | 8 | 8 | 7 | 7 |
| 13 | Stab. no. 4 from Table VI | 0.42 | 10 | 10 | 10 | 9 | 9 | 8 | 8 | 8 | 7 |
| 14 | Stab. no. 5 from Table VI | 0.21 | 10 | 10 | 9 | 8 | 8 | 7 | 6 | 4 | |
| 15 | Stab. no. 6 from Table VI | 0.21 | 10 | 10 | 9 | 8 | 8 | 7 | 6 | 5 | |

-continued

Table of Stabilizing Results

| Example No. | Stabilizer | Am't of Stab. phr[9] | Numerical Rating After Minute[11] | | | | | | | | |
|---|---|---|---|---|---|---|---|---|---|---|---|
| | | | 2 | 3 | 4 | 5 | 6 | 7 | 8 | 9 | 10 |
| 16 | Stab. no. 7 from Table VI | 0.21 | 10 | 10 | 9 | 8 | 8 | 7 | 7 | 5 | 3 |
| 17 | Stab. no. 8 from Table VI | 0.215 | 10 | 10 | 10 | 9 | 8 | 7 | 6 | 5 | |
| 18 | Bis[monomethyltin bis-(2-mercaptoethyloleate)]sulfide/Bis(dimethyltin 2-mercaptoethyloleate) sulfide | 0.20 | 9 | 8 | 8 | 8 | 7 | 6 | 5 | | |

[9]phr = parts per hundred parts of resin
[10]OHTP is o-hydroxythiophenol
[11]For the purpose of early color numerical ratings are terminated when a value of about 5 is reached Numerical ratings in the table illustrate that improved early color is obtained with stabilizer compositions of this invention.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What we claim and desire to protect by Letters Patent is:

1. A stabilizer composition comprising:
   A. an organic tin compound or mixture of organic tin compounds selected from compounds having the formulas:

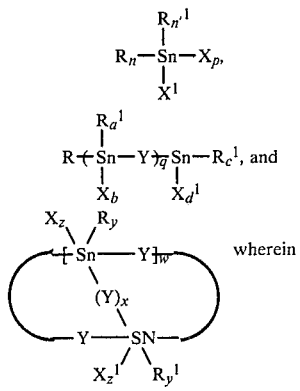

X and $X^1$ are the same or different and are selected from $-SR^2$, Cl, Br, I,

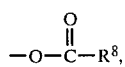

and $O-R^8$ with the proviso that in formula (III) when $z=1$ and in formulas (I) and (II) at least one X or $X^1$ is $-SR^2$;

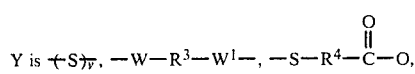

-continued

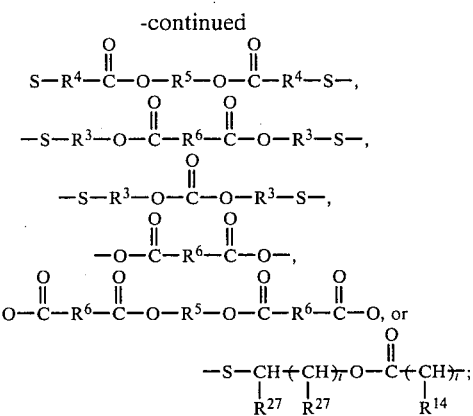

W and $W^1$ are the same or different and are oxygen or sulfur;

R and $R^1$ are the same or different and are selected from alkyl, aryl, alkenyl, aralkyl, alkaryl, cycloalkyl, cycloalkenyl,

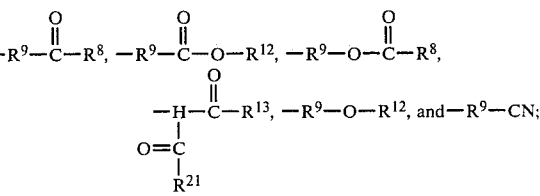

$R^2$ is alkyl, alkenyl, aryl, hydroxy-substituted aryl, aralkyl, cycloalkyl, cycloalkenyl,

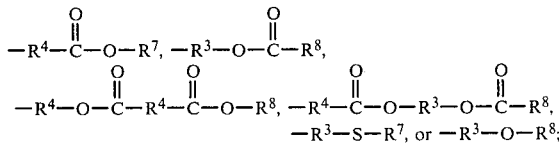

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is $-H$ or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy; $R^{14}$ is —H, aryl or $C_1$ to $C_{18}$ alkyl;

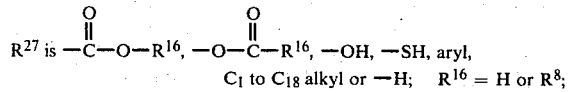

$R^{27}$ is $-\overset{O}{\overset{\|}{C}}-O-R^{16}$, $-O-\overset{O}{\overset{\|}{C}}-R^{16}$, —OH, —SH, aryl, $C_1$ to $C_{18}$ alkyl or —H; $R^{16} = H$ or $R^8$;

$i = 0$ or an integer from 1 to 6 inclusive;

$n = 0$, 1 or 2, $n' = 0$, 1 or 2 and $p = 1$ or 2 with the proviso that $n + n' = 1$ or 2 and $n + n' + p = 3$; $a = 0$, 1 or 2, $b = 0$, 1 or 2, $q = 1$ to 5, $c = 1$, 2 or 3 and $d = 0$, 1 or 2 with the proviso that $a + b = 2$ and $c + d = 3$;

$v =$ an integer from 1 to 8 inclusive; and $w = 0$, 1 or 2, $x = 0$ or 1, $y = 1$ or 2, $z = 0$ or 1 with the proviso that when $x = 0$ and $w = 1$ or 2 then $y = 1$ and $z = 1$ when $x = 1$ then $y = 1$, $z = 0$ and $w = 1$, when $w = 2$ then $x = 0$, $y = 1$ and $z = 1$, and when $w = 0$ then $x = 0$, $y = 1$, $z = 1$ and Y is $-W-R^3-W^1-$ or

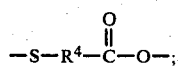

and

B. an organic compound or mixture of organic compounds selected from compounds having the formulas:

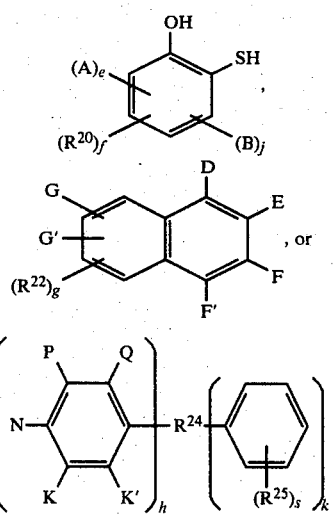

wherein

A is nothing, —OH or —SH,
B is nothing, —OH or —SH
D is —H, —SH, —OH or $R^{26}$
E is —H, —OH, —SH or $R^{26}$
F is —H, —SH, —OH or $R^{26}$
F' is —H, —OH, —SH or $R^{26}$
G is nothing, —OH or —SH
G' is nothing, —SH or —OH
K is —H, —SH, —OH or $R^{23}$
K' is —H, —OH, —SH or $R^{23}$
N is —H, —SH, —OH or $R^{23}$
P is —H, —SH, —OH or $R^{23}$
Q is —H, —SH, —OH or $R^{23}$ $R^{20}$ is nothing, alkyl, aryl, alkenyl, alkaryl, cycloalkyl, alkoxy or halogen,
$R^{26}$ is alkyl, alkenyl or halogen
$R^{22}$ is alkyl, alkenyl or halogen
$R^{23}$ is alkyl, alkenyl or halogen
$R^{24}$ is alkylene or alkenylene
$R^{25}$ is alkyl, alkenyl, halogen, —SH or —OH
$e$ is 0 to 2
$j$ is 0 to 2
$f$ is 0 to 3
$s$ is 0 to 3
$g$ is 0 to 3
$h$ is 1 to 4
$k$ is 0 to 3
$h + k$ is 2 to 4
$e + j + f$ is 0 to 4 with the proviso that (1) in formula (V) two of groups D, E, F and F' must be an OH group and an SH group bonded directly to adjacent ring carbon atoms, and (2) in formula (VI) two of groups K, K', N, P and Q must be an OH group and an SH group bonded directly to adjacent ring carbon atoms.

2. The stabilizer composition of claim 1 wherein the organic tin compound or mixture of organic tin compounds is according to formula (I).

3. The stabilizer composition of claim 1 wherein the organic tin compound or mixture of organic tin compounds is according to formula (II).

4. The stabilizer composition of claim 1 wherein the organic tin compound or mixture of organic tin compounds is according to formula (III).

5. The stabilizer composition of claim 1 wherein the organic compound or mixture of organic compounds is according to formula (IV).

6. The stabilizer composition of claim 1 wherein the organic compound or mixture of organic compounds is according to formula (V).

7. The stabilizer composition of claim 1 wherein the organic compound or mixture of organic compounds is according to formula (VI).

8. The stabilizer composition of claim 2 wherein in formula (I) R is methyl or butyl, $R^1$ is methyl or butyl, X is $-SR^2$ where $R^2$ is

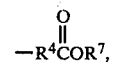

$X^1$ is $-SR^2$ where $R^2$ is

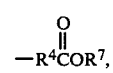

$n = 0$, 1 or 2, $n' = 0$, 1 or 2, $n + n' = 2$ and $p = 1$.

9. The stabilizer composition of claim 3 wherein in formula (II) R is methyl or butyl, X is $-SR^2$ where $R^2$ is

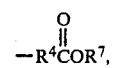

$R^1$ is methyl or butyl, $X^1$ is $-SR^2$ where $R^2$ is

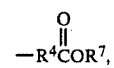

Y is —S—, a=1, b=1, c=2, d=1 and q=1.

10. The stabilizer composition of claim 4 wherein in formula (III) R is methyl or butyl, X is —SR² where R² is

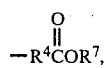

R¹ is methyl or butyl, X¹ is —SR² where R² is

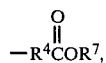

Y is —S—, w=1 or 2, x=0, y=1 and z=1.

11. The stabilizer composition of claim 5 wherein in formula (IV) A is nothing, B is nothing, R²⁰ is alkyl, e=0, f=1 and j=0.

12. The stabilizer composition of claim 1 wherein the weight ratio of (a) the organic tin compound or mixture of organic tin compounds to (b) the organic compound or mixture of organic compounds is from about 400:1 to about 1:199.

13. The stabilizer composition of claim 1 wherein the weight ratio of (a) the organic tin compound or mixture of organic tin compounds to (b) the organic compound or mixture of organic compounds is from about 400:1 to about 1:100.

14. The stabilizer composition of claim 1 wherein the weight ratio of (a) the organic tin compound or mixture of organic tin compounds to (b) the organic compound or mixture of organic compounds is from about 400:1 to about 1:20.

15. The stabilizer composition of claim 1, 2, 3, 4, 12, 13 or 14 wherein the organic compound is o-hydroxythiophenol.

16. A polymer composition comprising a halogen-containing organic polymer normally susceptible to heat induced deterioration and a stabilizingly effective amount of a stabilizer composition according to claim 1.

17. A pipe comprising a halogen-containing organic polymer normally susceptible to heat induced deterioration and a stabilizingly effective amount of a stabilizer composition according to claim 1.

* * * * *

UNITED STATES PATENT AND TRADEMARK OFFICE
CERTIFICATE OF CORRECTION

PATENT NO. : 4,314,934
DATED : February 9, 1982
INVENTOR(S) : K. V. Smith, J. D. Taylor It is certified that error appears in the above—identified patent and that said Letters Patent is hereby corrected as shown below:

Column 4, line 7, "z-1" should read --z=1--.

Column 4, line 16, that portion of the formula reading $$-O-\overset{O}{\underset{\|}{C}}-O-R^3-$$ should read $$-O-\overset{O}{\underset{\|}{C}}-R^4-.$$

Column 4, line 40, that portion of the formula reading $$\begin{array}{c}-H-\overset{O}{\underset{\|}{C}}-\\|\\O=C\\|\end{array}$$ should read $$\begin{array}{c}-CH-\overset{O}{\underset{\|}{C}}-.\\|\\O=C\\|\end{array}$$

UNITED STATES PATENT AND TRADEMARK OFFICE
CERTIFICATE OF CORRECTION

PATENT NO. : 4,314,934

DATED : February 9, 1982

INVENTOR(S) : K. V. Smith, J. D. Taylor

It is certified that error appears in the above—identified patent and that said Letters Patent is hereby corrected as shown below:

Column 16, line 26, that portion of the formula reading $$-O-\overset{O}{\underset{\|}{C}}-O-R^3-$$ should read $$-O-\overset{O}{\underset{\|}{C}}-R^4.$$

Column 16, line 46, that portion of the formula reading $$\begin{matrix} & O \\ & \| \\ -H-C & \\ & | \\ O=C & \\ & | \end{matrix}$$ should read $$\begin{matrix} & O \\ & \| \\ -CH-C-. & \\ | & \\ O=C & \\ | & \end{matrix}$$

Signed and Sealed this

Eighth Day of June 1982

[SEAL]

Attest:

GERALD J. MOSSINGHOFF

Attesting Officer

Commissioner of Patents and Trademarks